United States Patent
Fougere et al.

[15] 3,670,243
[45] June 13, 1972

[54] PHYSICAL DISPLACEMENT MEASURING SYSTEM UTILIZING IMPEDANCE CHANGING THE FREQUENCY OF AN OSCILLATORY CIRCUIT

[72] Inventors: Guy L. Fougere, Lincoln; John L. Rothery, Marblehead, both of Mass.; Raymond H. Miller, Warwick, R.I.

[73] Assignee: Federal Products Corporation

[22] Filed: Feb. 27, 1970

[21] Appl. No.: 14,937

Related U.S. Application Data

[63] Continuation-in-part of Ser. Nos. 331,225, Dec. 17, 1963, abandoned, and Ser. No. 592,502, Nov. 7, 1966, abandoned, and Ser. No. 730,539, May 20, 1968, abandoned.

[52] U.S. Cl..............................324/57 R, 324/59, 324/61 R, 324/65 R, 324/81, 331/65

[51] Int. Cl.....................................G01r 27/26, G01r 27/00
[58] Field of Search................324/57, 59, 60, 61, 65, 81; 331/65, 66, 14, 36; 33/172 E

[56] References Cited

UNITED STATES PATENTS

2,747,095  5/1956  Boucke................................331/65 X

*Primary Examiner*—Edward E. Kubasiewicz
*Attorney*—Barlow and Barlow

[57] ABSTRACT

An analog data transmission system having as the transmitting means an oscillator with a tuned circuit and means to vary the tuning of this circuit by an incremental value by a switching means operating repetitively, the entire system including a receiving means having a frequency discriminator followed by a voltage sensitive readout device which measures the difference between the two alternate frequencies of the oscillator caused by the switching.

3 Claims, 9 Drawing Figures

FIG. 1

PATENTED JUN 13 1972    3,670,243
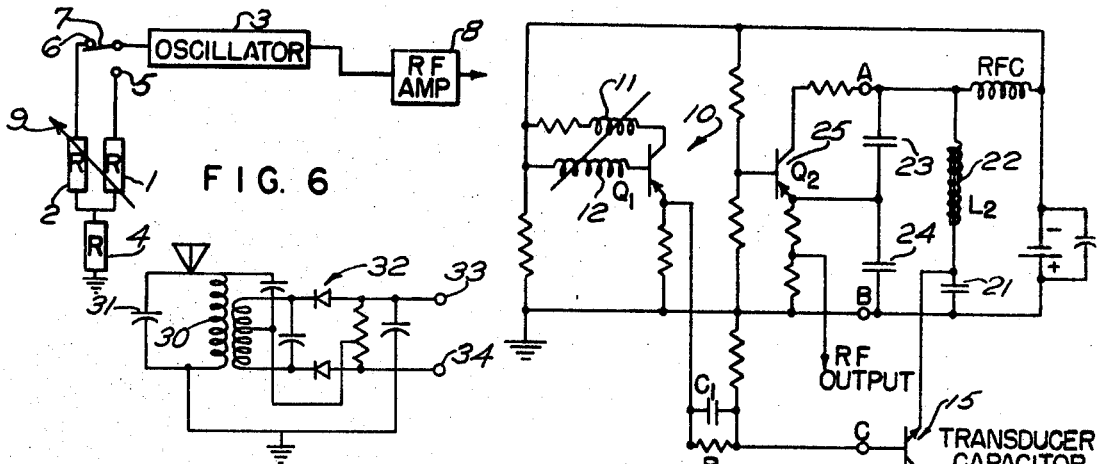
FIG. 6
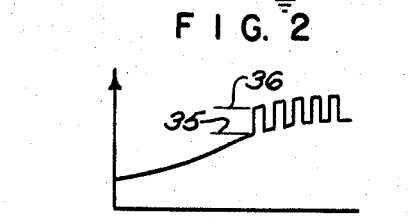
FIG. 2
FIG. 1
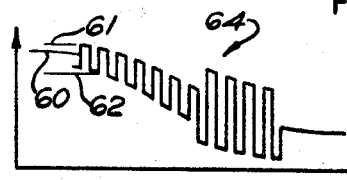
FIG. 4
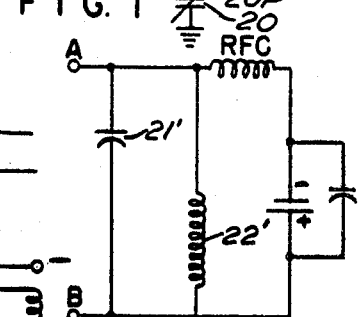
FIG. 4A
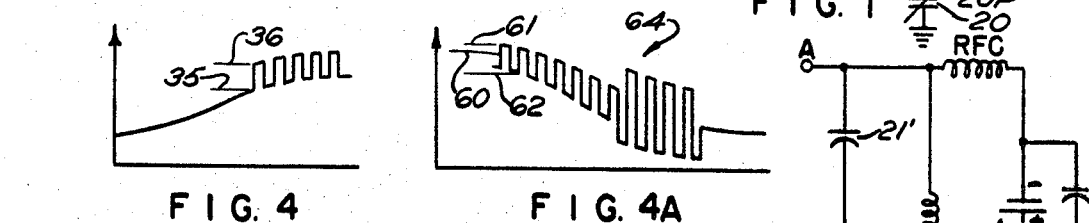
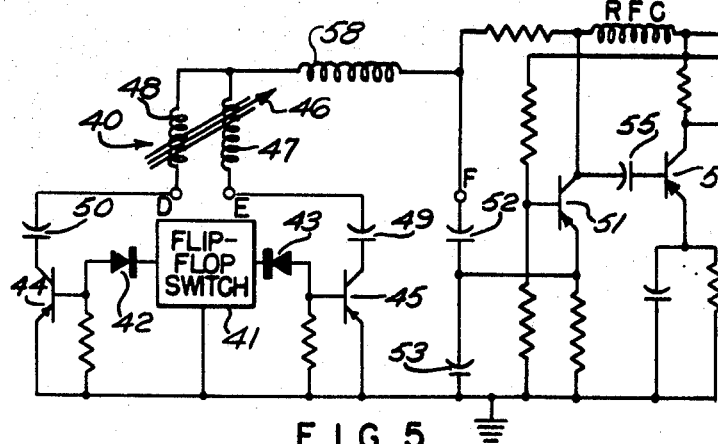
FIG. 5
FIG. 3
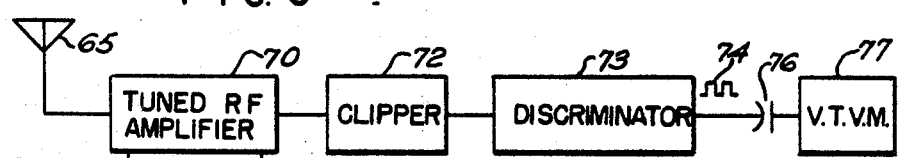
FIG. 7
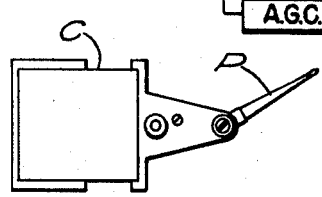
FIG. 8
INVENTORS
GUY L. FOUGERE
JOHN L. ROTHERY
BY RAYMOND H. MILLER
*Barlow & Barlow*
ATTORNEYS 3,670,243

PHYSICAL DISPLACEMENT MEASURING SYSTEM UTILIZING IMPEDANCE CHANGING THE FREQUENCY OF AN OSCILLATORY CIRCUIT

CROSS REFERENCE TO RELATED APPLICATIONS

This application is a continuation-in-part of our earlier filed applications, Ser. No. 331,225, filed Dec. 17, 1963, now abandoned, Ser. No. 592,502, filed Nov. 7, 1966 now abandoned, and Ser. No. 730,539, filed May 20, 1968 now abandoned.

BACKGROUND OF THE INVENTION

It is frequently desired to transmit by wire or wireless means information from an electrical or a mechanical transducer whose parameters are altered by a physical variable under measurement. In normal telemetry it has been common to take the physical quantities being sensed and use them to change either the frequency or amplitude of a transmitting oscillator. Sometimes the variable oscillator is used to beat against the output of another oscillator which could be termed the standard or reference oscillator. In any event the changes in oscillator frequency or amplitude are detected and are interpreted as being proportional to the quantity measured by the transducer. In those cases in which frequency shift or frequency modulation is the mode of transmission or where a beat frequency is used, the stability of the oscillator must be carefully controlled. If it is not, the sensitivity or accuracy of the device becomes greatly impaired since it is impossible in the detection process to separate the changes due to drift of an oscillator from those imposed by the transducer. Basically, most of the changes are due to ambient temperature fluctuations as well as aging of the parts used in the electronic circuits. Temperature control and compensation techniques have been attempted for devices of this nature, but such means are only partially successful. This invention eliminates the effect of the undesired frequency shift or oscillatory circuit change by use of a novel data transmission system.

SUMMARY OF THE INVENTION

An analog data transmission system is provided for converting relatively small transducer changes into electrical signal changes that are free from the effects of frequency drift and substantially free of amplitude changes by employing small impedance elements in an oscillator circuit and rapidly switching at least one such impedance element in and out of the oscillatory circuit. This action changes the oscillator frequency, which change is detected by a frequency sensitive detector commonly referred to as a frequency discriminator. The output of the detector is proportional to the difference in frequency produced by the oscillator, and this output can then be fed to a suitably calibrated readout device. One impedance element may be varied in value in response to a measurement desired, and thus the system is particularly useful for measurement systems. The effects of long-term frequency changes due to ambient temperature fluctuations and aging of the parts are eliminated by making the frequency discriminator responsive only to rapid frequency changes.

DESCRIPTION OF THE DRAWINGS

FIG. 1 is a circuit diagram showing a simplified form of translating system constructed in accordance with the principles of the invention;

FIG. 2 is a circuit diagram of a simple receiving system for the device of FIG. 1;

FIG. 3 is a modified form of FIG. 1;

FIGS. 4 and 4A are diagrams illustrating the function and operation of the circuits of FIGS. 2 and 5, respectively;

FIG. 5 is a circuit diagram showing a modified form of the invention and in particular the translating system;

FIG. 6 is a block diagram showing a modified form of FIG. 5;

FIG. 7 is a diagram showing a typical receiving system with a read-out device; and FIG. 8 is a representation of a suitable measurement probe.

DESCRIPTION OF THE PREFERRED EMBODIMENTS

In proceeding with the invention, to transmit information from a source, two frequencies are alternately transmitted, the information being the spacing between these frequencies. The receiving or sensing portion may conveniently contain an amplifier, the output of which is then detected for frequency shift by a linear frequency discriminator (frequency to voltage converter). When the A.C. component of this output is measured, it will be proportional to the frequency difference between the two frequencies transmitted and thus give a direct read-out of the information transmitted.

In a preferred configuration, an oscillatory circuit is provided with a switch element, the switch element having in circuit therewith a transducing impedance element. Essentially, the transducing impedance element is switched in and out of the circuit so that the frequency of the oscillator is controlled first by the circuit parameters in the oscillator circuit per se and then secondly by the circuit parameters of the oscillator circuit per se with the added equivalent of the transducer or sensing device. Preferably the circuit parameters of the transducer are made small relative to the circuit parameters of the basic oscillator circuit so that a very small frequency shift takes place as the transducer element is switched into the circuit. For example, a frequency shift of 10kHz is adequate and this can be achieved, by way of example, by using a ratio of impedances of from 7:1 to 40:1. When operating in this mode with a very small or incremental frequency shift, the electrical operating points of all the active elements in the oscillator circuit remain substantially constant. In this fashion with all components acting substantially the same in both modes, substantially all of the factors that affect a frequency drift of an oscillator will operate identically in both modes. Measuring, therefore, the difference in frequency between the two modes of operation of the oscillator which in practice is a voltage difference across a frequency discriminator output, which is linear, will represent the variable being measured to a highly accurate degree. Drift variations are accordingly cancelled, being the same in each mode. It has been further found advantageous that the switching frequency between each mode be rapid with respect to normal drifts encountered by thermal variations and power supply variations.

With reference to the drawing and particularly FIG. 1, the basic information circuit is illustrated to show the principle of operation. Here we find a transistor 10 having an inductance 11 in the collector circuit and an inductance 12 in the base circuit which are coupled together. If the values of the circuit parameters are chosen correctly, there will be produced substantially square waves of current at an audio rate by virtue of the feedback between the collector and the base of transistor 10. This signal controls the switching of the transducer impedance element in an oscillator circuit which will now be described.

The emitter of the transistor 10 is coupled to the base of transistor 15 to control the conduction thereof, so that transistor 15 is essentially acting as a switch, being either fully conducting or completely cut off. Between the collector and ground there is connected a transducer capacitance 20, having a measurement probe 20P, which may be switched in parallel with a capacitance 21 that forms part of the frequency determining circuit made up of inductance 22 and capacitances 23 and 24 that are arranged in a standard Colpitts circuit fashion in the collector-emitter circuit of the transistor 25. In this type of circuit the capacitance 21 along with the inductance 22 form the principal frequency determining components of the oscillator circuit, and accordingly with the transistor 15 alternately becoming conductive, it will place the transducer capacitance 20 in and out of a parallel circuit with the capacitance 21. This will cause the oscillator frequency to effectively vary between two difference values at a rate dependent upon the switching rate.

As an alternate oscillator configuration, that shown in FIG. 3 may be employed, substitution being effected at terminals A, B, C. In this arrangement a parallel resonant circuit is employed of capacitance 21' and inductors 22', 22A. The transducer inductor 22A, which has measurement probe 22P mechanically coupled thereto for varying the inductance, is alternately shorted by the transistor 15 so that the resonant frequency will vary between two slightly spaced limits.

The RF output is shown as being taken from the emitter circuit of the transistor 25 and may be used to drive an antenna either directly, or through a frequency changer and driver circuit, or be directly connected to a receiving piece of equipment which includes a frequency discriminator and detector and may take a simple form such as shown in FIG. 2. This is shown as being nothing more than a parallel resonant circuit made up of an inductance 30, a capacitance 31 and a discriminator 32. The detection may also be by a slope detector and diode detector technique, the main criteria being that the slope be linear so to achieve proper response.

The output from the frequency discriminator and detector taken at the terminals 33, 34 may be as shown in FIG. 4. Here we find the ordinate being diagrammed as voltage which is the analog of frequency, while the abscissa is diagrammed as time. At the outset, when the transducer capacitance 20 is connected into the circuit, the frequency shifts from a value indicated at line 35 to a new value indicated at line 36. Also in this diagram we note that over a long period of time the frequency changes; that is, the oscillator drifts. The drift, however, is only equivalent to a shift in the base line from which the switching frequency is measured, and thus the difference in frequency between the oscillator with the transducer capacitance 20 connected or not connected will remain the same so long as the capacitance 20 remains the same.

There are some further changes or refinements that can be made to this basic circuitry which have been illustrated in FIG. 5. In this circuit there is used as the electrical transducer generally indicated at 40 a three-terminal device whose electrical parameters are changed by the application of a physical quantity to be measured. in this type of transducer as the electrical parameters of one terminal are changed in a given sense, the electrical parameter of the other terminal changes in an opposite fashion. Thus, it is merely necessary to change the type of switching signal generator used to a free-running multi-vibrator which is here designated in block diagram form as a flip-flop switch 41. The two outputs from the switch signal generator 41 are shown as being taken through diodes 42 and 43 which connect to the bases of switching transistors 44 and 45, respectively. The probe of the transducer 40 is indicated at 46, and displacement of this probe will shift the values of the inductance coils 47 and 48 in opposite directions. Switching, of course, of the switch 41 will alternately connect the coils 47 and 48 through capacitances 49 and 50, respectively, into the frequency determining circuit of an oscillator formed by transistor 51 and principal frequency determining components 52, 53, and 58. As shown herein, this oscillator circuit is connected to an RF amplifier, the collector of the transistor 51 being capacitively coupled through capacitance 55 to the base of an amplifier transistor 56 which may have an inductance 57 in the collector circuit that may serve as a radiating element.

To understand the operation of this particular circuit, reference should be made to FIG. 4A. In the illustrated embodiment of FIG. 5, it must be remembered that the one or the other of the inductances 47 or 48 is always connected to the oscillator. The average frequency, therefore, of the oscillator, assuming equal "ON" times for each switching transistor, remains constant, but the peak frequency excursions in the high and low directions depart equally from this average as a variable under measurement changes. Accordingly, the line 60 represents an analog of the average frequency of the oscillator when the values of the inductances 47 and 48 are equal. As the circuit is switched from one incremental frequency determining element to another, we find that the upper frequency, such as indicated at line 61, will be determined by one inductance, while the lower frequency, such as indicated by line 62, will be determined by the other inductance. As the motion arm 46 of the transducer is changed to a new position, we have a condition where the peak frequency excursions have changed such as indicated generally at 64 but have departed equally from the average frequency indicated by the line 60.

As an alternate form of frequency control, reference is made to FIG. 6. The oscillator 3 is on continuously and is designed to have minimum drift characteristics. The frequency of oscillator 3 is illustrated as having frequency control by resistances 1 and 2 which may be varied by coupling to probe 9. This affords one method of control, and this is particularly so in non-sinusoidal oscillator configurations and other forms known to those skilled in the art. A switch 7 connects the resistances 1 and 2 alternately in series with resistance 4 to the oscillator 3 via contacts 5 and 6. The switch shown schematically may, of course, be electronic.

A typical measurement probe is illustrated in FIG. 8 and consists of the probe finger P which is mechanically coupled to means for varying the impedance housed in casing C. Conveniently the entire transmitter circuit is enclosed in casing C which may be suitably mounted for measurement functions.

A typical receiver for use with the differential transducer systems illustrated in FIGS. 5 and 6 is shown in FIG. 7 as consisting of an antenna 65 which receives the signal radiated by the means 57 and feeds it to a tuned RF amplifier 70 preferably having automatic gain control 71 and thence desirably to a peak clipper stage 72 followed by a frequency discriminator or slope detector 73. The automatic gain control and peak clipper are used to eliminate undesirable effects due to changes in received signal strength caused by propagation path differences as the transmitter and receiver alter their relative positions. As well understood, the slope detector must be tuned so as to receive both frequencies produced by the oscillator circuitry on the linear portion thereof. Usually this is accomplished by tuning the center of the slope to the mean frequency. Effectively, the output of the discriminator 73 is a series of square wave pulses 74 which are imposed upon a direct current level. The peak to peak magnitude (A.C. portion) of these pulses is proportional to the frequency difference. The D.C. level is sensitive to drift. If only the A.C. portion of this signal is passed on to the next stage, such as through a blocking capacitor 76, it may be fed to a volt meter which now reads the magnitude of the square wave. This value is proportional to the frequency difference that has effectively been observed when the frequency of the transmitter has been altered between $f_1$ and $f_2$. In FIG. 5 for example, $f_1$ and $f_2$ occur alternately as the inductances 47 and 48 are alternately connected to the oscillator circuit. Hence the magnitude read on the volt meter 77 is proportional to the displacement of the transducer probe 46 and independent of the oscillator drift.

Basically, therefore, there is shown herein a telemetric system for transmitting information by the operation of a single oscillator which is capable of operation over a range of frequencies, the oscillator being rapidly switched between these two frequencies and in which the frequencies are determined by one or more transducer elements. This type of circuit is also so arranged that it lends itself very well to the use of wireless means for the transmission of the telemetry as well as using wire means.

We claim:

1. A measuring system comprising two impedance elements, a variable transducer impedance element whose impedance is substantially smaller compared to the impedance of the remaining two elements, a measurement probe, means coupling said probe to the transducer impedance element to vary the impedance thereof, a transmitting oscillator having a frequency determining circuit including said two impedance elements, said oscillator including an output, switch means, means repetitively operating said switch means, said switch means alternately coupling and decoupling said transducer impedance element and said frequency determining circuit to change the frequency of the output of said oscillator by alternately switching said transducer impedance element into said frequency determining circuit, and receiving means coupled to the output of said oscillator means, said receiving means having a frequency discriminator the alternating current output of which is linearly proportional to the difference between the two alternate frequencies of said oscillator, a voltage sensitive readout device, and means coupling said voltage sensitive device to said frequency discriminator.

2. A measuring system as in claim 1 wherein said receiving means is a wireless receiving means and includes a peak clipper ahead of said frequency discriminator, the output of the clipper connected to the frequency discriminator.

3. A measuring system for detecting a physical displacement comprising an oscillator including a frequency determining circuit having impedance elements, a transducer, a measurement probe, the transducer having two impedance means, means coupling the impedance means for varying the impedances inversely with respect to each other, said coupling means including a mechanical connection to said probe, each of said transducer impedance means having a magnitude that is substantially smaller compared to the magnitude of the individual impedance elements in the frequency determining circuit, a switch, means repetitively operating said switch, the impedance means of said transducer being connected alternately to said oscillator frequency determining circuit through said switch whereby the frequency of said oscillator is varied periodically by switching the impedance means, and frequency discriminator means coupled to the output of said oscillator, said frequency discriminator means producing an alternating current output signal proportional to the difference between the two alternate frequencies of said oscillator.

* * * * *